United States Patent [19]
Niwa et al.

[11] Patent Number: 5,916,502
[45] Date of Patent: Jun. 29, 1999

[54] DECORATED SHAPED PRODUCT HAVING SOURCE EXPRESSION APPLIED THERETO, METHOD FOR MANUFACTURING SAME AND SHAPED BASE MATERIAL THEREFOR

[75] Inventors: Takeshi Niwa, Shizuoka; Tsutomu Yoshida, Tachikawa; Naoyuki Sato, Sodegaura, all of Japan

[73] Assignees: Cubic Co. Ltd., Shimizu; Misawa Homes Co., Ltd., Tokyo, both of Japan

[21] Appl. No.: 08/777,793

[22] Filed: Dec. 31, 1996

Related U.S. Application Data

[62] Division of application No. 08/451,167, May 26, 1995.

[30] Foreign Application Priority Data

May 27, 1994 [JP] Japan ................................. 6-138358

[51] Int. Cl.[6] ............................. B05D 1/18; B05D 5/06; B29C 41/22
[52] U.S. Cl. ..................... 264/40.7; 101/177; 101/492; 264/45.3; 264/48; 264/73; 427/281; 427/430.1; 427/439
[58] Field of Search .................. 101/177, 492; 264/40.7, 45.3, 48, 73; 427/267, 280, 281, 377, 430.1, 439

[56] References Cited

U.S. PATENT DOCUMENTS 4,465,539  8/1984  Saihara et al. .
4,836,814  6/1989  Bambara et al. ........................... 441/65
5,190,706  3/1993  Knaus ..................................... 254/45.9

FOREIGN PATENT DOCUMENTS 59-78839   5/1984  Japan .
5-169407   7/1993  Japan .
6-40198    2/1994  Japan .
6-41316    2/1994  Japan .
6-166300   6/1994  Japan .

OTHER PUBLICATIONS

English translation of JP 6–166300, Jun. 94.

English translation of JP 6–40198, Feb. 94.

*Primary Examiner*—Blaine R. Copenheaver
*Attorney, Agent, or Firm*—Wenderoth, Lind & Ponack, L.L.P.

[57] ABSTRACT

A decorated shaped product having an expression or design applied thereto which closely resembles an actual expression of a source material such as a natural object is disclosed. The product includes a shaped base material formed thereon with a flow pattern and a transfer pattern of which at least a part is subjected to a concealment exposing treatment and which is printed on the shaped base material. Also, a method manufacturing the product and the shaped base material are disclosed.

14 Claims, 10 Drawing Sheets

DECORATED SHAPED PRODUCT HAVING SOURCE EXPRESSION APPLIED THERETO, METHOD FOR MANUFACTURING SAME AND SHAPED BASE MATERIAL THEREFOR

This is a Divisional application of Ser. No. 08/451,167, filed May 26, 1995, pending.

BACKGROUND OF THE INVENTION

This invention relates to a decorated shaped product, a method for manufacturing the same and a shaped base material therefor, and more particularly to a shaped base material, a decorated shaped product obtained by forming a source pattern on the shaped base material and a method for manufacturing such a decorated shaped product.

The words "shaped base material" used herein indicate a shaped material obtained by subjecting a molding material to injection molding or the like. The words "decorated shaped product" used herein mean a product obtained by forming a source pattern on the shaped base material. Thus, it will be noted that the shaped base material corresponds to an intermediate product for the decorated shaped product which is a final product. The words "source material" used herein mean a material which includes a natural material such as wood, an ore or the like and on which a decoration of the decorated shaped product of the present invention is based. The words "source pattern" used herein mean a pattern of the source material such as, for example, a woodgrain pattern, a marble pattern or the like. Formation of the source pattern on the shaped base material may be carried out by, for example, transfer such as printing, coating, or the like. The words "source expression" or "source design" mean a motif, expression or design of the source material including the source pattern and the like.

Formation of a shaped base material by injection molding or the like has been often carried out by foaming a molding material the order to decrease the weight of the shaped base material and improve physical properties thereof. Unfortunately, such foaming often causes a streak-like flow pattern called a silver streak to occur on a shaped base material obtained. The shaped base material having such a flow pattern formed thereon is generally recognized to be defective. In order to remedy such a defects it has been carried out to apply a base coat of a deep color to the defective shaped base material or apply a design or color sufficient to keep the defect from sight, or to thereby prepare a desired pattern which is then printed or coated.

There have been employed curved-surface printing techniques for printing a design such as a source pattern or the like on a shaped base material having a complicated curved surface and/or a plane surface continuously formed thereon. The curved-surface printing techniques use a transfer film including a carrier sheet previously coated thereon with a transfer pattern such as a source pattern or the like, wherein the transfer pattern is transferred onto a surface of the shaped base material utilizing a liquid pressure generated by immersing the shaped base material by a predetermined depth in a transfer liquid while floating the transfer film on the transfer liquid.

The curved-surface printing techniques are considered to be epoch-making, because of successively accomplishing transfer of a source pattern to a shaped base material which conventional coating techniques fail to successively carry out. Nevertheless, the techniques fail to satisfy recent demands relating to formation of an expression or design more closely resembling that of a source material.

In view of the foregoing, a printed product by liquid-pressure transfer and a method for manufacturing the same have been proposed as disclosed in Japanese Patent Application Laid-Open Publication No. 166300/1994. In the proposal, two transfer layers different in transfer pattern are used to satisfactorily express depth which the conventional curved-surface printing techniques fail to provide. Unfortunately, the proposal is deficient in productive efficiency because it is necessary to repeat the transfer operation.

Also, an attempt has been made for improving a shaped base material so that it per se may contribute to an improvement in source expression or design. The attempt is to add woodmeal to a synthetic resin material in order which is a molding material, to provide a shaped base material with a tone, a smell and a touch closely resembling those of wood. However, wood generally possesses peculiar patterns such as a flat grain pattern, a pattern called a grain (grain pattern) wherein medullary rays complicatedly cross with each other, and the like; therefore, mere addition of the woodmeal to the synthetic resin material fails to permit such patterns to be expressed.

Another attempt has been carried out to express a flat grain pattern by adding a color pigment to a synthetic resin material to prepare a mixture, followed by shaping of the mixture by extrusion, to thereby provide a pattern resembling a flat grain pattern. However, an actual flat grain pattern is delicately varied in color and tone such as gloss, shade or the like. Thus, mere mixing of the color pigment with the synthetic resin material falls to permit delicate variations in color and tone to be expressed.

Further, it has been proposed to mix a color pigment with a synthetic resin material to prepare a mixture, which is then subjected to injection molding to provide a flat grain pattern similar to that obtained by the above-described extrusion or a different source pattern. However, such proposal likewise fails to provide a source pattern resembling that of an actual source material, so that it is still desired to take an approach necessary to provide the mixture with any directionality or uneven streak. Moreover, there has been made an attempt to improve coating techniques to provide any further source expression or decorative expression while utilizing the above-described shaped base material. Nevertheless, no satisfactory results were obtained.

SUMMARY OF THE INVENTION

The present invention has been made in view of the foregoing disadvantages of the prior art while considering that the above-described streak pattern appearing on the shaped base material is utilized as a part of a source expression or design in place of being regarded as a defect, to thereby reconsider both shaping and decoration.

Accordingly, it is an object of the present invention to provide a decorated shaped product which is capable of permitting a source expression or design to be more truly realized.

It is another object of the present invention to provide a decorated shaped product which is capable of being manufactured with improved productive efficiency.

It is a further object of the present invention to provide a method for manufacturing a decorated shaped product which is capable of providing a decorated shaped product having a source expression or design more truly realized.

It is still another object of the present invention to provide a shaped base material which is capable of providing a decorated shaped product having a source expression or design more truly realized.

In accordance with one aspect of the present invention, a decorated shaped product having a source expression applied thereto is provided. The decorated shaped product includes a shaped base material formed by injection molding and a transfer pattern formed on a surface of the shaped base material by printing. The shaped base material is formed by foaming a synthetic resin material so as to be provided on a surface thereof with a flow pattern. The transfer pattern includes a source pattern and is provided at at least a part thereof with at least one of an ink-free pattern section which has no transfer ink applied thereto, a thin-film pattern section formed by reducing a thickness of a transfer ink applied and a light-color pattern section formed by light-coloring a transfer ink. The shaped base material has woodmeal added thereto.

In a preferred embodiment of the present invention, the synthetic resin material comprises a combination of at least two colored synthetic resin materials different in shade of color from each other or a combination of at least one non-colored synthetic resin material and at least one colored synthetic resin material.

In a preferred embodiment of the present invention, the woodmeal is at least partially colored so that there occurs a difference in shade of color between the woodmeal and the synthetic resin material.

In a preferred embodiment of the present invention, the woodmeal has a luster pigment added thereto by placing.

In a preferred embodiment of the present invention, the transfer pattern printed is formed on a surface thereof with a transparent or colored-transparent gloss topcoat, which has a precision-finished surface.

In accordance with another aspect of the present invention, there is provided a method for manufacturing a decorated shaped product. The method comprises shaping processing and decoration processing. The shaping processing includes the steps of forming a molding material by adding woodmeal to a synthetic resin material, subjecting the molding material to heating, melting and liquefaction, injecting the molding material into a molding tool while lightly mixing the molding material so as to render it mottled and foaming it, and curing the molding material to form a shaped base material. The decoration processing includes a printing transfer step of immersing the thus-formed shaped base material in a transfer liquid wherein a transfer film provided thereon with a source pattern of which at least a part is subjected to a concealment exposing treatment is floated, to thereby form a transfer pattern on a surface of the shaped base material by a liquid pressure due to the immersion.

In a preferred embodiment of the present invention, the shaped base material is formed by injection molding.

In a preferred embodiment of the present invention, the shaping processing further includes the step of charging the molding material into an injection molding machine including a cylinder and a screw arranged in the cylinder. The step of subjecting the molding material to hearing, melting and liquefaction is carried out in the cylinder of the injection molding machine. The step of lightly mixing the molding material so as to render it mottled and foaming it is carried out by means of the screw.

In a preferred embodiment of the present invention, the synthetic resin material comprises a combination of at least two colored synthetic resin materials different in shade of color from each other or a combination of at least one non-colored synthetic resin material and at least one colored synthetic resin material.

In a preferred embodiment of the present invention, the decoration processing further includes a topcoat formation step of forming a transparent or colored-transparent gloss topcoat on a surface of the shaped product after the printing and a precision-finish step of subjecting the topcoat to precision-finish by buffing.

In accordance with a further aspect of the present invention, a decorated shaped product having a source expression applied thereto is provided. The decorated shaped product includes a shaped base material formed by injection molding and a coating applied to a surface of the shaped base material. The shaped base material is formed by foaming a synthetic resin material so as to be provided on a surface thereof with a flow pattern and the coating is subjected at at least a part thereof to a concealment exposing treatment. The shaped base material has woodmeal added thereto.

In accordance with still another aspect of the present invention, a decorated shaped product having a source expression applied thereto is provided. The decorated shaped product includes a shaped base material formed by injection molding and a topcoat applied to a surface of the shaped base material. The shaped base material is formed by foaming a synthetic resin material so as to be provided on a surface thereof with a flow pattern and the topcoat is formed so as to exhibit transparent or colored transparent gloss. The shaped base material has woodmeal added thereto.

In accordance with a still further aspect of the present invention, a shaped base material is provided. The shaped base material includes a body formed of a synthetic resin material having woodmeal added thereto by injection molding. The synthetic resin material is subjected to foaming so that a flow pattern may be formed on a surface of the body.

In a preferred embodiment of the present invention, the woodmeal has a luster pigment added thereto by placing.

In a preferred embodiment of the present invention, the synthetic resin material for the body comprises a combination of at least two colored synthetic resin materials different in shade of color from each other or a combination of at least one non-colored synthetic resin material and at least one colored synthetic resin material and is subjected to foaming while being distributed in a mottled manner.

In a preferred embodiment of the present invention, the body has a glass fiber added thereto.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, the present invention will be described in detail with reference to the accompanying drawings. The following description will be made in connection with a wood as an example of a source material.

Figures 1A, 1B:
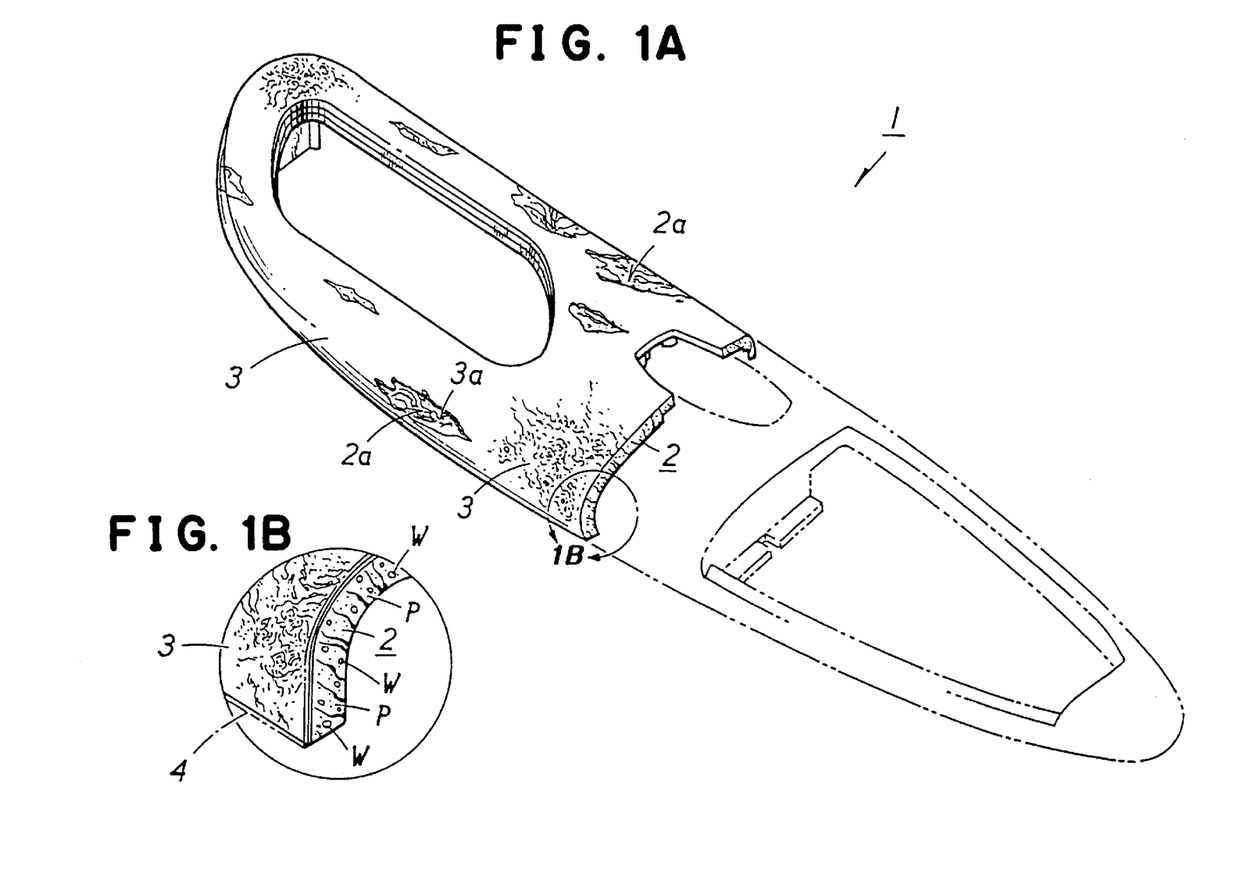
FIG. 1 is a partially cutaway perspective view showing an embodiment of a decorated shaped product having a source expression applied thereto according to the present invention while showing an enlarged part thereof.

Referring first to FIG. 1, an embodiment of a decorated shaped product having a source expression or design applied thereto according to the present invention is illustrated. A decorated shaped product of the illustrated embodiment generally designated at reference numeral 1 includes a shaped base material 2 formed of a synthetic resin material by injection molding and a transfer pattern 3 printed or coated on the shaped base material 2. The transfer pattern 3 has a source pattern applied to a surface thereof. In the illustrated embodiment, the source pattern is a wood pattern. Also, in the illustrated embodiment, the transfer pattern 3 is formed on the shaped base member 2 by printing and a topcoat 4 is formed on the transfer pattern 3. Then, a surface 4a of the topcoat 4 is subjected to a precision-finish treatment.

The shaped base material 2 is made by foaming a suitable synthetic resin material P such as ABS resin, polyethylene, polypropylene, polystyrene, polyvinyl chloride or the like, resulting in closed cells and/or open cells being formed in the shaped base material 2. To the shaped base material 2 is added woodmeal W. In the illustrated embodiment, the woodmeal W may be made by finely pulverizing scraps, chips or powdery cuttings of a conifer such as a pine, a Japanese cedar, a Japanese cypress or the like, followed by drying. The woodmeal W may be formed into a size of about 5 to 120 μm.

Alternatively, the woodmeal W may be made by finely pulverizing scraps, chips or powdery cuttings of a broadleaf tree. It may be suitably selected depending on a source pattern to be employed in the transfer pattern 3.

Figure 10:
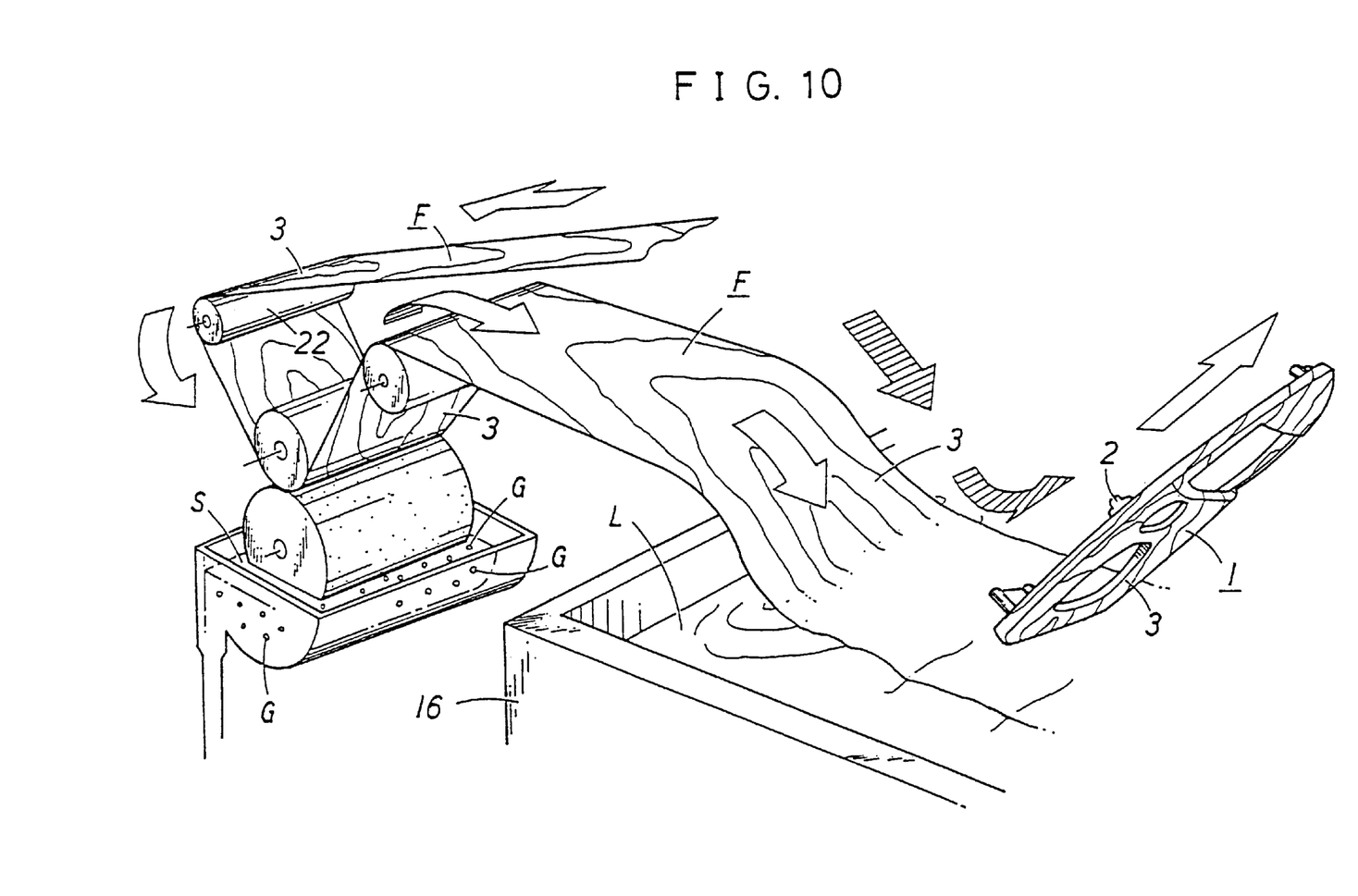
FIG. 10 is a perspective view showing liquid-pressure transfer using a transfer film having another source pattern applied thereto.

The synthetic resin material P may comprise only a colored synthetic resin material of a single color. Alternatively, it may comprise a combination of at least two colored synthetic resin materials different in shade of color from each other or a combination of at least one non-colored synthetic resin material and at least one colored synthetic resin material. When only one colored resin of a single color is used for this purpose, it is preferably has a color which conforms to the source pattern of the transfer pattern 3 or permits the source pattern of the transfer pattern 3 to be enhanced. Also, when two or more colored synthetic resin materials are used in combination to express a difference in shade of color, the combination is preferably carried out to partially accentuate a flow pattern 2a appearing on a surface of the shaped base material 2. Alternatively, when the source pattern of the transfer pattern 3 is such a flat grain pattern as shown in FIG. 10, the combination may be carried out so that a heartwood section in the pattern is rendered different in color from a sapwood section therein. Such a combination may be carried out by kneading the woodmeal W into a pure synthetic resin material (base resin) to prepare a master batch. This permits the master batch to have a light skin-color because the woodmeal W is generally skin-colored. Another combination of the thus-prepared master batch with the base resin permits another difference in shade of color to be provided. Further combinations such as a combination of the base resin with a color pigment, a combination of the master batch with a color pigment and the like may be likewise employed for this purpose.

Such combinations as described above are likewise true of the woodmeal W. For example, the woodmeal W may be at least partially colored so as to permit a difference in shade of color to occur between the woodmeal W and the synthetic resin material P. Alternatively, the woodmeal W may have a luster pigment G incorporated therein or added thereto by placing. Also, a fine inorganic pigment such as titanium oxide other than or in combination with the luster pigment G may be added to the woodmeal W to restrain or prevent discoloring and/or deterioration of the woodmeal W due to heating and pressurizing during injection molding. The words "addition by placing" used hereto mean that a part of the luster pigment G or a combination of a part of the luster pigment G with a part of the fine inorganic pigment such as titanium oxide or the like is carried in the woodmeal W by embedding and the combination is carried therein while being kept joined together. Also, at least one of the pigments may be added to the synthetic resin material P for the shaped base material 2 as a part of the material P.

The luster pigment G carries out multiple reflection of light to exhibit elegant luster called pearlescence. A natural luster pigment which has been used for many years is made of fish scales, However, the natural luster pigment is hard to be mass-produced, resulting in being highly expensive, therefore, a synthesized luster pigment has been widely substituted therefor.

The shaped base material 2 thus made has a streak-like flow pattern 2a formed on a surface thereof, which is called a silver streak or the like in the art. The silver streak means a streak of a silver-white color formed on the shaped product so as to extend in a direction of flow of the molding material and is caused due to inclusion of a pellet which has been insufficiently dried. More particularly, incorporation of an insufficiently dried pellet in the material causes injection of the molding material to be carried out while keeping a moisture ingredient and a volatile ingredient left therein, as a result the ingredients are vaporized upon discharge of the molding material from a nozzle. Thus, charging of the molding material into a mold while keeping the volatilized ingredients contained in the molding material causes the molding material to fail to be closely contacted with a surface of the mold, resulting in a white streak appearing at an area where the molding material has insufficient contact with the mold so that the white streak extends in a direction of flow of the molding material, In addition, gas is often generated in a cylinder of an injection molding machine due to decomposition of the molding material, a plasticizer, a stabilizer, an ultraviolet light absorber, an antistatic agent or the like, leading to formation of the silver streak. Also, the silver streak is likewise produced due to inclusion of air, addition of a different kind of molding material, incorporation of a large amount of powder or the like. The silver streak relatively readily occurs on a shaped product formed by foaming of synthetic resin and conventionally the streak causes the product to be defective.

In the present invention, the shaped base material 2 is formed of synthetic resin. The shaped base material 2 may have woodmeal W and the like added thereto. Addition of such a material to the shaped base material rather causes the silver streak or flow pattern 2a to be positively formed on a surface of the shaped base material 2. Formation of the flow pattern 2a also depends on viscosity of the molding material and a variation in temperature of the molding material relating to the viscosity. Such a flow pattern 2a is called a flow mark or wavy flow pattern, and may be a streak pattern formed in stripes about a portion of the shape product corresponding to a gate of the mold. It is a matter of course that the flow mark may be used in combination with the silver streak. When woodmeal W or the like is added to the molding material, moisture inevitably contained in the woodmeal contributes to foaming of the molding material to a high degree, to thereby form the flow pattern 2a in an emphasized manner or permit at least a part of unevenness of the woodmeal W or the like to appear on a surface of a portion of the molding material at which the flow pattern 2a occurs. Thus, impingement of light on the woodmeal W permits the flow pattern 2a to be emphasized. Foaming of the above-described master batch or foaming of a combination of the master batch with a material causing a difference in shade of color such as the above-described base resin causes a melting point of the master hatch to be increased as compared with that of at least the base resin, resulting in the master batch molten material being unevenly mixed with the base resin molten material. Also, the woodmeal W is relatively uniformly dispersed in the synthetic resin material P of the molten master batch. Thus, the source expression is satisfactorily exhibited.

The decorated shaped product 1 includes the shaped base material 2 having the flow pattern 2a thus formed on the surface thereof, as well as the transfer pattern 3 printed on the shaped base material 2 as described hereinafter. In the illustrated embodiment, the transfer pattern 3 may be formed by previously printing a source pattern by screen printing based on photoengraving. Also, in the decorated shaped product 1 of the illustrated embodiment, the transfer pattern 3 is subjected at at least a part thereof to a concealment exposing treatment.

Figure 2:
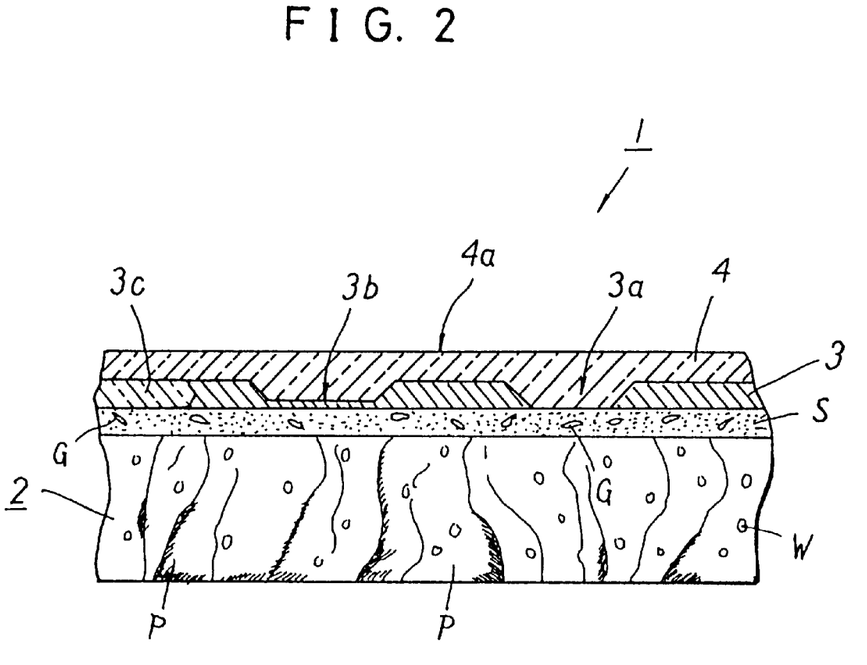
FIG. 2 is a fragmentary vertical sectional view showing a lamination structure of the decorated shaped product of FIG. 1.
Figure 3:
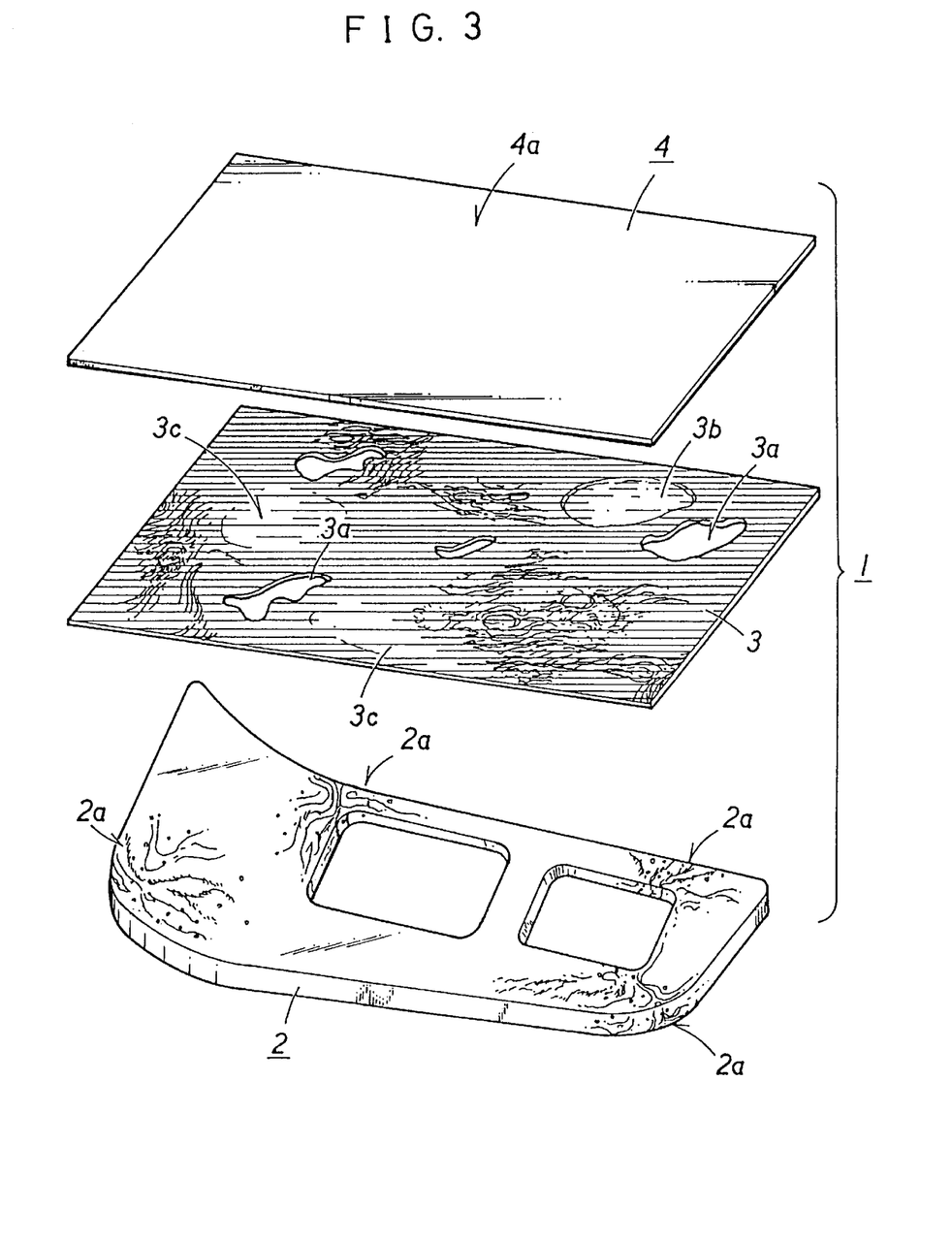
FIG. 3 is an exploded perspective view of the decorated shaped product shown in FIG. 1.
Figures 4A, 4B:
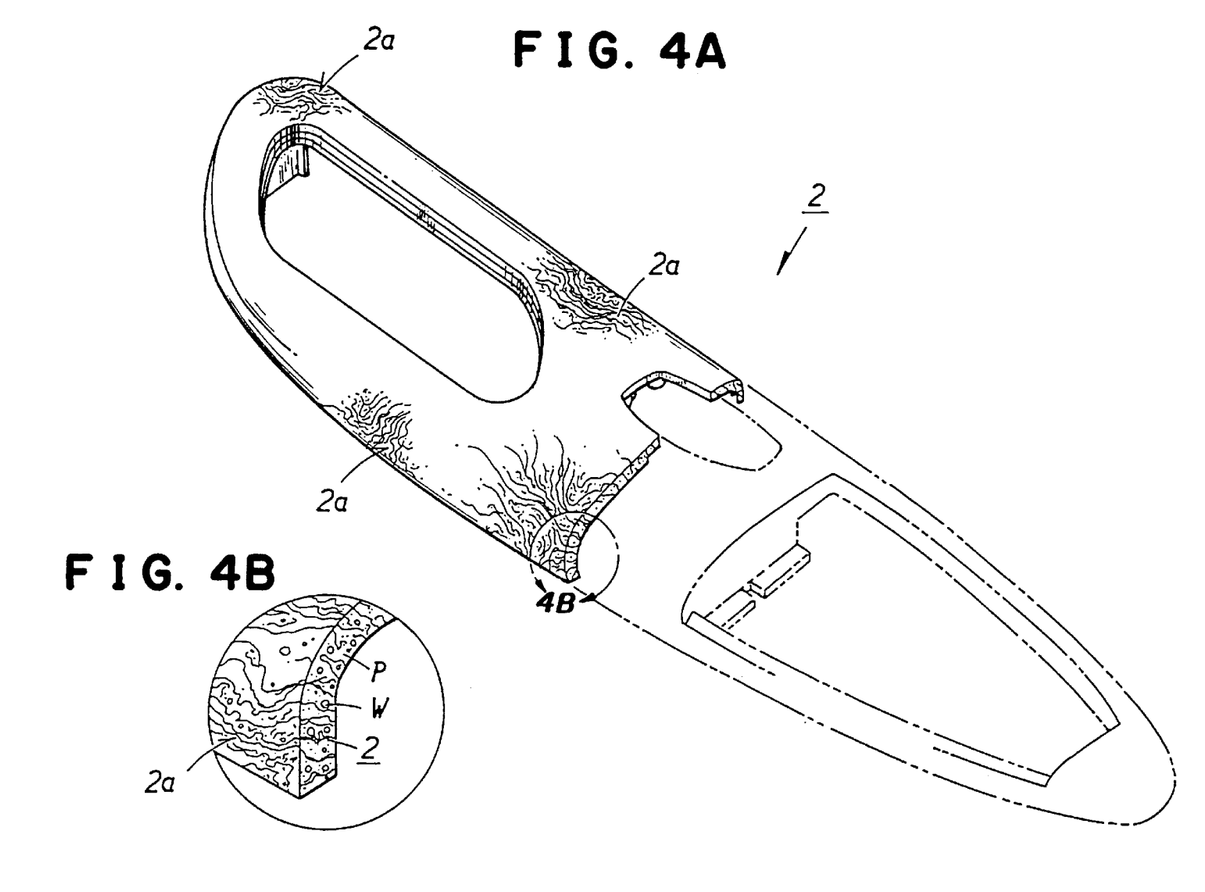
FIG. 4 is a partially cutaway perspective view showing an embodiment of a shaped base material according to the present invention while showing an enlarged part thereof.
Figure 5:
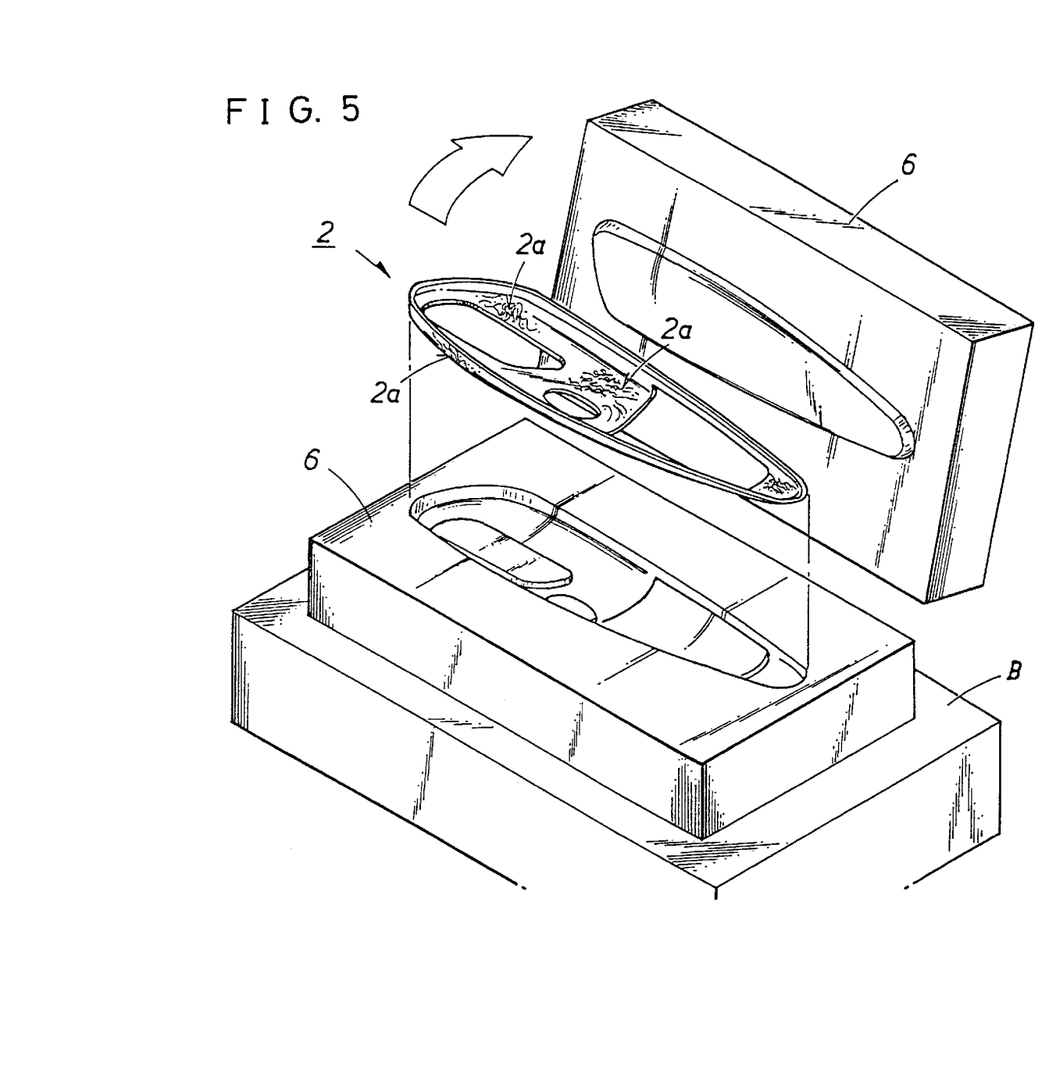
FIG. 5 is a perspective view showing removal of a shaped base material of the present invention from a molding tool.

The transfer pattern 3, as shown in FIGS. 2 and 3, is provided thereon with at least one of an ink-free pattern section 3a to which a transfer ink is not applied, a thin-film pattern section 3b formed by reducing a thickness of a transfer ink applied and a light-color pattern section 3c formed by light-coloring a transfer ink or any combination of the sections 3a to 3c. Such sections 3a to 3c each act as a concealment exposing treatment which permits the flow pattern 2a formed on the surface of the shaped base material 2 to be observed therethrough from an outside of the transfer pattern.

As can be seen from the foregoing, the ink-free pattern section 3a means a section of the transfer pattern 3 at which the transfer ink is not applied at all and the thin-film pattern section 3b means a section of the transfer pattern 3 formed by reducing the amount of application of transfer ink to reduce a thickness of the transfer ink applied, to thereby form a thin-film which permits the flow pattern 2a formed on the surface of the shaped base material 2 to be externally observed therethrough. Also, the light-color pattern section 3c means a section of the transfer pattern 3 formed by substitutionally coating a part of the surface of the shaped base material 2 with another transfer ink having a lighter color, resulting in visibility of the flow pattern 2a on the shaped base material 2 being improved.

The source pattern expressed as the transfer pattern 3 includes, for example, a stone pattern such as a marble pattern, a granite pattern or the like; a leather pattern such as an ostrich pattern, a crocodile or alligator skin pattern or the like; a pattern like a tortoise shell, ivory or the like; and a wood pattern of precious wood, such as a flat grain pattern, a woodgrain pattern or the like.

Now, a wood pattern will be described by way of example. First, a woodgrain pattern includes wooden fibers, vessels and tracheids appearing in a vertical direction of a trunk and medullary rays appearing in a lateral direction thereof. Also, in the flat grain pattern, a heartwood section and a sapwood section are delicately different in color from each other. Further, a natural tree includes nodes, worm-eaten spots and discolored portions due to decay or rot. Unfortunately, it is substantially impossible to conscientiously express a flat grain pattern of an actual tree. This is for the reason chat the transfer pattern 3 merely expresses only a plane or two-dimensional pattern and fails to express depth and gloss which do not appear on a plane surface. Thus, in the illustrated embodiment, it is not intended to express all elements of the flat grain pattern by means of the transfer pattern 3. Substitutionally, the illustrated embodiment is constructed in such a manner that the above-described concealment exposing treatment permits the depth and luster to be expressed and the transfer pattern 3 expresses the remaining part of the source pattern. This is true of a wood grain pattern described hereinafter.

The term "grain (grain pattern)" generally indicates a pattern wherein a luster portion is expressed in the form of spots or streaks or as a difference in shade of color due to existence and crossing of medullary rays. Now, typical grains will be described hereinafter.

Circular Grain (Tamamoku)

It is a circular or spiral grain pattern and typically appears at a zelkova tree, a camphor tree, a maple tree or the like. A circular grain which has smaller circles is called a grape circular grain (budohmoku) and typically appears at a camphor tree or the like. It may be used as a decorative material.

Wavy Grain

It can be seen on a vertical section of a broadleaf tree and appears on a plane of a straight grain. It typically appears at a maple tree, a mahogany or the like.

Bird Eye Grain (Choganmoku)

It occurs at a section at which arrangement of wooden fibers is twisted and appears as if a conical recess is formed. It can be seen at a maple tree, an ash tree or the like and is valuable as a decoration.

Scale-Like Grain (Nyorinmoku)

It is a grain like a fish scale and appears at a zelkova tree or the like.

Peony Grain (Botanmoku)

It is a flower-like grain and appears at a zelkova tree, a mulberry tree or the like.

Crapy Grain (Chirimenmoku)

It appears at a Japanese horse chestnut, a maple tree, a mahogany tree or the like.

Brindled Grain (Torabumoku)

It is a spotted grain of a medullary ray and appears at a tree of a straight grain such as a Japanese oak tree, an evergreen oak tree or the like.

Other Grains

Other grains include a silver grain appearing at a Japanese beech tree or the like; a ribbon grain appearing at a mahogany, a lauan, a Japanese horse chestnut, a Japanese persimmon tree or the like; a stripe grain (shimamoku) appearing at a zebra wood, a black walnut or the like; and a dancing grape grain (maibudohmoku) appearing at a zelkova tree, a camphor tree or the like. FIGS. 1, 3, 8 and 9 each show a transfer pattern 3 expressing a grain pattern and FIG. 10 shows a transfer pattern 3 expressing a flat grain pattern.

The decorated shaped product 1 of the present invention may be so constructed that the shaped base material 2 is formed on the surface thereof with a coating. In this instance, the coating is subjected at least at a part thereof to a concealment exposing treatment. The concealment exposing treatment may be carried out to form a paint-free region at a part of the coating or a thin-coated portion at a part of the coating. Alternatively, a clear paint may be used for the coating, to thereby permit the flow pattern 2 formed on the surface of the shaped base material 2 to be observed through the coating. The term "concealment exposing treatment" which is carried out on a part of the coating of course includes a concealment exposing treatment carried out on the whole coating.

Also, the decorated shaped product 1 of the present invention may be so constructed that the shaped base material 2 is formed on the surface thereof with a topcoat. In this instance, the source pattern is expressed by only the flow pattern 2a appearing on the surface of the shaped base material 2. Thus, in order to permit the flow pattern 2a to be enhanced, it is essential to add such woodmeal W as described above to the molding material for the shaped base material 2. The woodmeal W may likewise have a luster pigment G added thereto by placing. Addition of the luster pigment G permits uneven brightness of the luster pigment G to be added to the flow pattern 2a, resulting in the source expression being more satisfactorily attained.

Even when the synthetic resin material P which is a main component for the molding material of the shaped base material 2 is light skin-colored, addition of the woodmeal W cooperates with a difference in density due to a foaming agent and a reflection angle to permit the flow pattern 2a to be distinctly formed, resulting in the source expression being satisfactorily exhibited. Also, the synthetic resin material P may include a combination of two or more colored materials different in shade of color or a combination of at least one non-colored material and at least one colored material. Use of such a combination for the material P cooperates with a difference in melting points between the materials and positioning of a gate to carry out foaming of the material while permitting the colored material to be distributed in a spotted or mottled manner in the flow pattern 2a formed by the woodmeal. W, so that the flow pattern 2a may be further enhanced.

The synthetic resin material P may have a glass fiber added thereto in order to increase mechanical strength of the shaped base material 2. For this purpose, a glass fiber having a length as short as several mm or less may be used, resulting in the shaped base material 2 formed being significantly decreased in weight and thickness.

It is also possible to form a topcoat 4 on the transfer pattern 3 having the source pattern expressed thereon or the coating which has been subjected to the concealment exposing treatment. Alternatively, the topcoat 4 may be applied directly to the surface of the shaped base material 2. The topcoat 4 is provided for the purpose of protecting the transfer pattern 3 printed on the shaped base material 2, the coating applied onto the surface of the shaped base material 2 or the shaped base material 2 per se. In the present invention, the topcoat 4 may be transparent or colored-transparent so that the flow pattern 2a appearing on the surface of the shaped base material 2 may be observed through the topcoat or through a portion of the transfer pattern 3 or coating on which the concealment exposing treatment was carried out as well as the topcoat. A color of the colored-transparent topcoat may be light or dark so long as it permits the flow pattern 2a to be observed therethrough.

Also, the topcoat 4 is desirably made of a lustrous material so as to exhibit visibility sufficient to significantly enhance depth and gloss of the flow pattern 2a. The topcoat 4 desirably has a surface 4a subjected to a precision-finish treatment such as buffing, liquid honing, lapping or the like, resulting in being increased in luster.

In general, buffing may be typically used for this purpose. In the present invention, finishing buffing is employed for the purpose of polishing. Finishing buffing may be carried out using fifty flannel fabrics laminated on each other by way of example. Further, a suitable abrasive is used to provide the buffing with luster.

Now, a method for manufacturing the decorated shaped product 1 having the source expression thus applied thereto according to the present invention will be described hereinafter. The method of the present invention generally comprises shaping processing and decoration processing.

(1) Shaping Processing

Figures 6A, 6B, 6C, 6D:
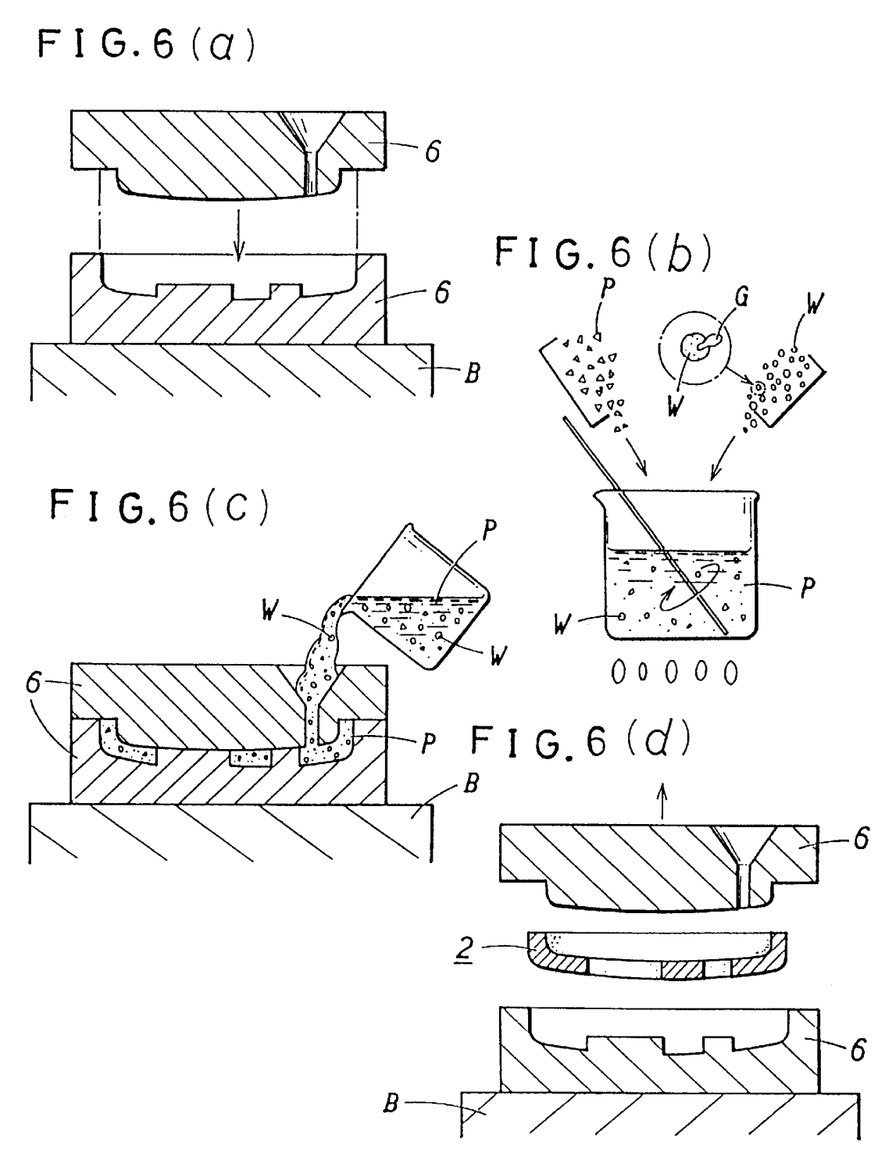
FIGS. 6(a) to 6(d) each are a schematic view showing each of steps of forming a shaped base material of the present invention.

The shaping processing is to render a molding material liquefied and then form it into a shaped base material 2 of a predetermined configuration. Principally, a molding tool or mold 6 is put on a platen B as shown in FIG. 6(a) and a molding material including a synthetic resin material P and woodmeal W or the like added to the material P is melted by heating and lightly mixed, to thereby be kept mottled. The term "spotted" or "mottled" used herein generally means a condition that two kinds of materials different in properties coexist in an uneven or non-uniform manner so as to be recognized independently from each other. Thus, the term Includes such a pattern as recognized to be similar to the above-described streak-like flow pattern as well. Molding of the material may be actually carried out using an injection molding machine, wherein such a master batch and a base resin as described above are charged together with a foaming agent and the like at a predetermined proportion in a hopper of the injection molding machine and guided to a cylinder of the injection molding machine. Then, the materials are force fed toward a nozzle arranged at a distal end of the cylinder by means of a screw disposed in the cylinder, during which the materials are heated, melted and suitably mixed together.

The synthetic resin material may include a combination of two or more materials different in shade of color such as a combination of a master batch of a light skin color having woodmeal added thereto with either a base resin of a white color or a master batch having a color pigment added thereto, so that a pattern may be enhancedly expressed and recognized. Such hearing, melting and mixing steps as shown in FIG. 6(b) are actually carried out in the injection molding machine. Also, a foaming step is likewise is carried out in the injection molding machine or the molding tool 6 as described hereinafter.

Then, as shown in FIG. 6(c), the molding material which has been thus mixed in a mottled manner and foamed is poured into the molding tool 6, resulting in being cured to provide a crude shaped base material. Subsequently, as shown in FIG. 6(d), the crude shaped base material thus obtained is taken out of the molding tool 6 and burrs or the like are removed from the crude shaped base material, resulting in the shaped base material 2 of the present invention which has the flow pattern 2a formed thereon being provided.

The above description of formation of the shaped base material 2 by injection molding has been by way of example, Alternatively, other shaping techniques such as, for example, extrusion molding and the like may be conveniently employed so long as they permit the flow pattern 2a to be likewise formed on the shaped base material 2a.

(2) Decoration Processing

The decoration processing is to render the source expression on the thus-formed shaped base member 2 more distinct or enhanced, protect the surface of the shaped base material 2 and/or provide the surface of the shaped base material 2 with a gloss, to thereby improve design characteristics of the shaped base material 2. For this purpose, the decoration processing may three steps or a printing transfer step, a topcoat formation step and a precision-finish step. Alternatively, the decoration processing may only include the printing transfer step. Also, when the decorated shaped product 1 which is so constructed that the shaped base material 2 is formed thereon with the coating applied is to be provided, a coating step is substituted for the printing transfer step, so that the decoration processing is constituted by only the coating step. In addition, when the decorated shaped product 1 is so constructed that the topcoat 4 is formed directly on the surface of the shaped base material 2, the decoration processing may be carried out by only the topcoat formation step or by a combination of the topcoat formation step and precision-finish step.

(i) Printing Transfer Step

In the printing transfer step, a transfer film F is prepared prior to transfer of the transfer pattern 3 to the surface of the shaped base material 2. The transfer film F used in the present Invention may be prepared, for example, by applying a transfer ink to one surface of a carrier sheet 8 comprising a water-soluble film to form the transfer pattern 3 thereon.

The transfer film F thus prepared is used to transfer the transfer pattern 3 to the surface of the shaped base material 2. More particularly, the present invention may carry out the transfer using liquid-pressure transfer techniques. For this purpose, the transfer pattern 3 is transferred to the shaped base material 2 by means of such a liquid-pressure transfer unit 10 as shown in FIG. 7.

Figure 7:
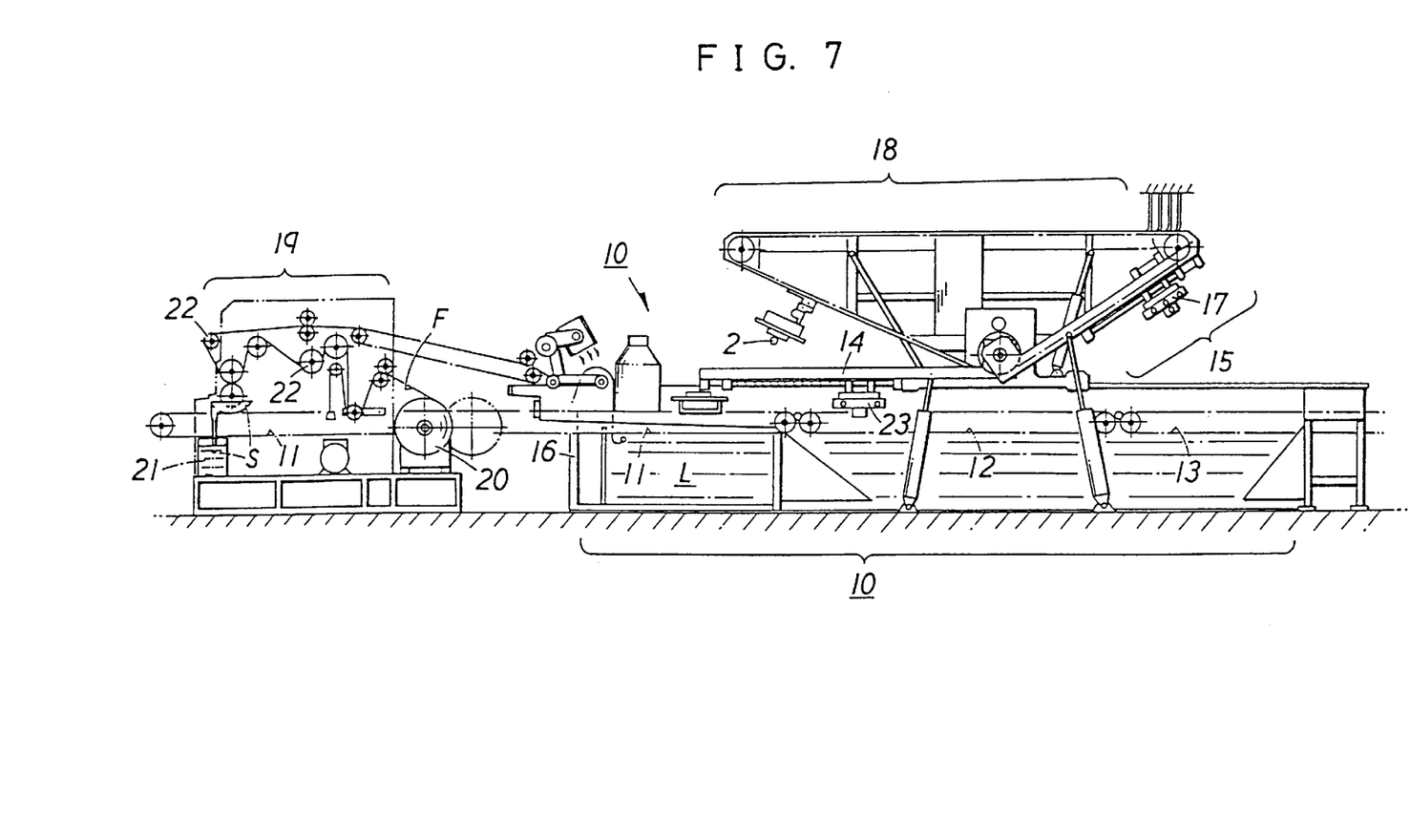
FIG. 7 is a side elevation view generally showing a liquid-pressure transfer line.
Figures 8A, 8B:
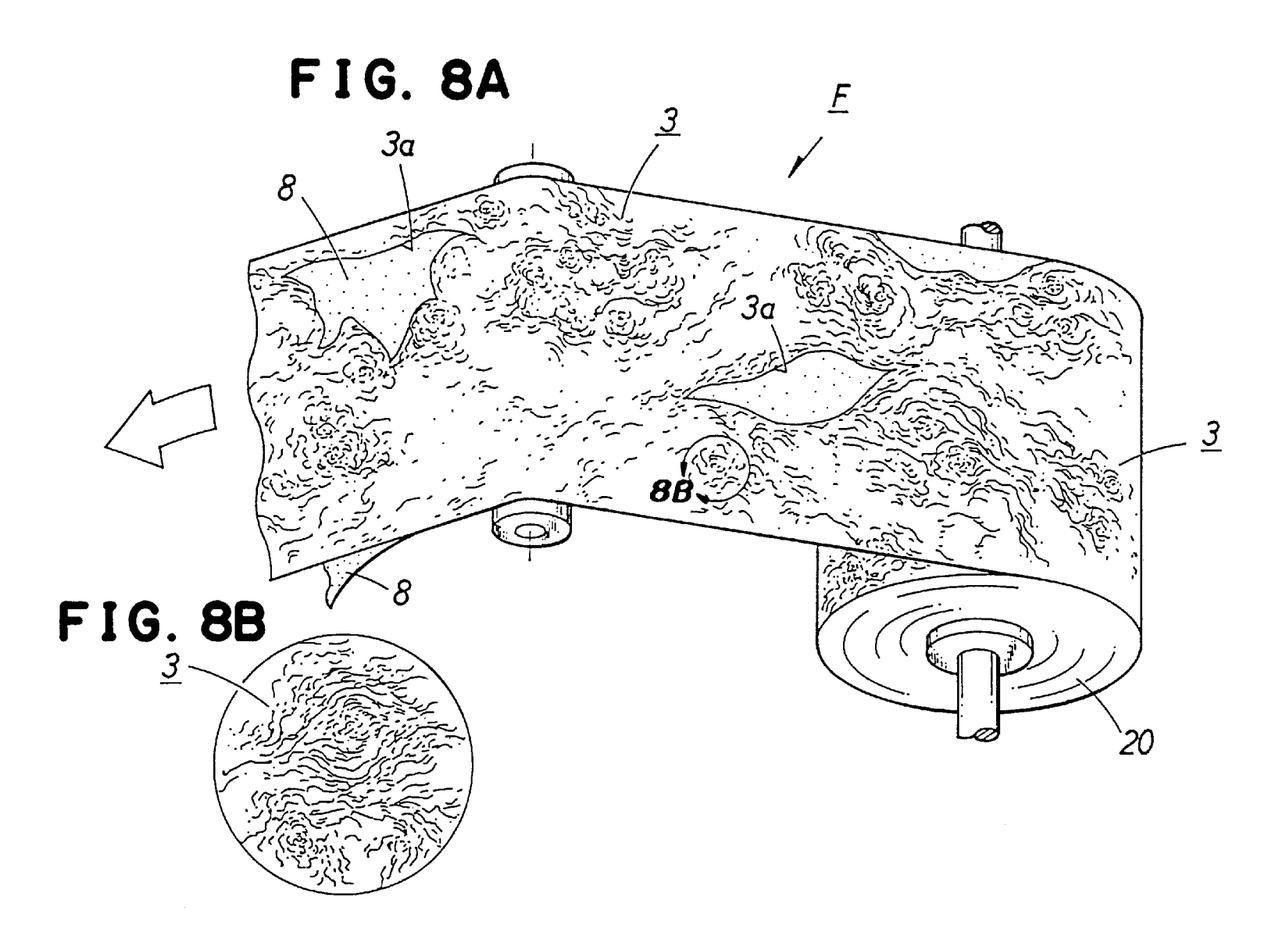
FIG. 8 is a perspective view of delivery of a transfer film from a film roll having the transfer film wound thereon which was subjected to a concealment exposing treatment.

FIG. 7 shows a liquid-pressure transfer line, which includes the above-described liquid-pressure transfer unit 10, a feed conveyor 11, a connection conveyor 12 and a discharge conveyor 13 each arranged laterally of the liquid-pressure transfer unit 10, and an automatic feed unit 14 and an automatic discharge unit 15 each arranged above the connection conveyor 12 and located laterally of the liquid-pressure transfer unit 10.

The liquid-pressure transfer unit 10 includes a transfer tank 16 for storing a transfer liquid L therein, a transfer conveyor 18 located above the transfer tank 16 for supporting transfer holding units 17 thereon at predetermined intervals, and a transfer film feed unit 19. The transfer film feed unit 19 includes a film roll 20 on which the transfer film F prepared as described above is wound in a roll-like manner and a solvent tank 21 for storing therein an activator S for providing a transfer ink printed on the carrier sheet 8 and dried with viscosity to render the transfer ink transferable. Such a transferable state is referred to as "activated" herein. Also, feed rollers 22 are arranged for feeding the transfer film F successively, so that the transfer film F delivered from the film roll 20 is activated by the activator S in the solvent tank 21 and then continuously fed to the transfer rank 16.

The automatic feed unit 14 includes a plurality of grip means 23, which act to feed the shaped base material 2 or an object on which the transfer is to be carried out (hereinafter referred to as "transferred object") to the transfer tank 16 and remove it therefrom upon completion of the transfer while gripping it.

Figure 9:
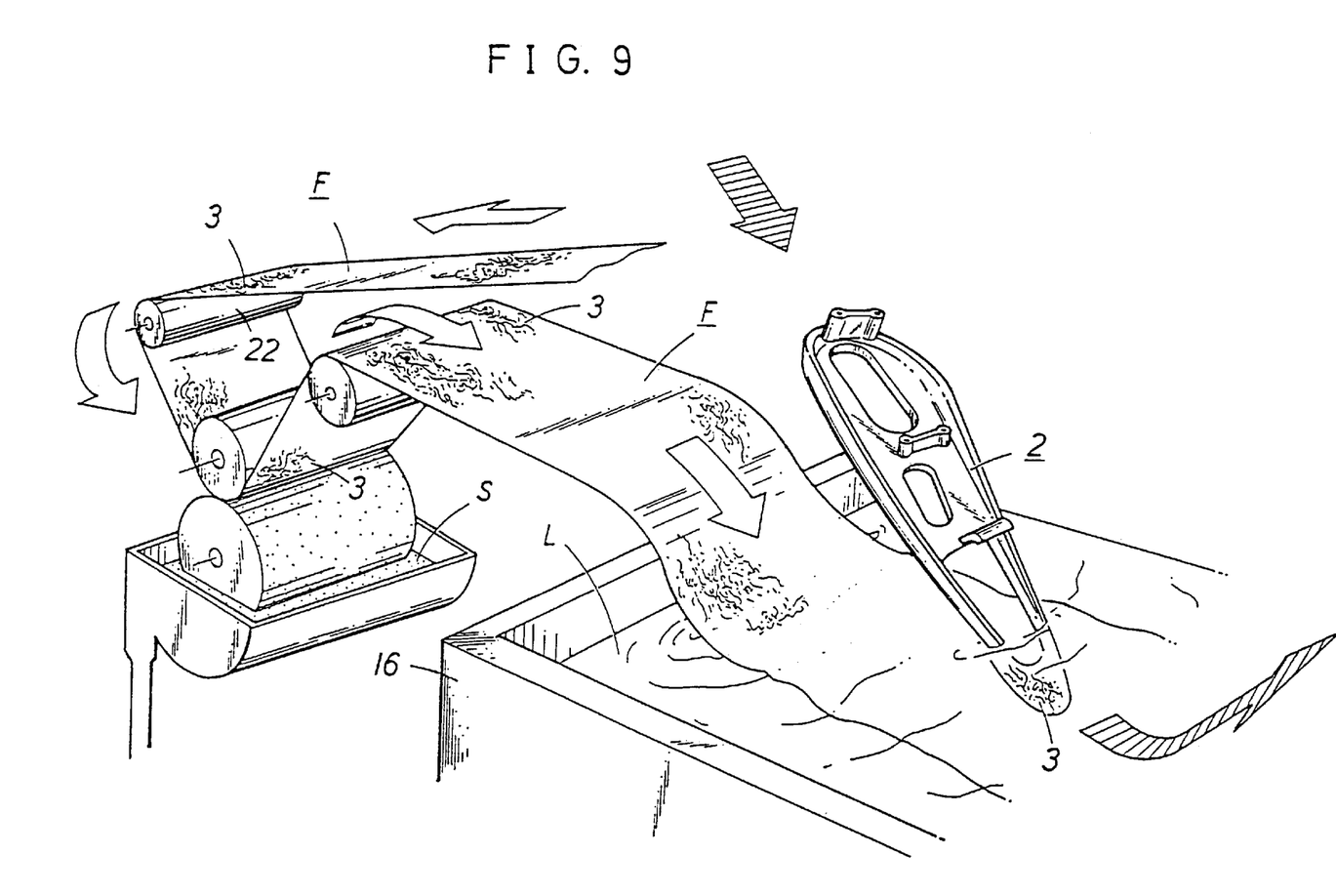
FIG. 9 is a perspective view showing liquid-pressure transfer using the transfer film of FIG. 8.

Transfer of the transfer pattern 3 to the surface of the shaped base material 2 by means of the liquid-pressure transfer unit 10 is carried out in such a manner that the transfer film F delivered from the film roller 20 is coated on a surface thereof to which the transfer ink is applied with the activator S in the solvent tank 21 and then fed to the transfer liquid L in the transfer tank 16 as shown in FIGS. 9 and 10. The activator S may have the luster pigment G contained therein. This permits the luster pigment G to exist on an outer side of the surface of the decorated shaped product 1 as shown in FIG. 2, so that gloss of the product may be further enhanced. The transfer film F fed into the transfer liquid L is reacted with the transfer liquid L, resulting in being swollen and extended, and then moved in a downstream direction while being carried on a stream of the transfer liquid L and floating therein.

When swelling of the transfer film F and activation of the transfer ink are promoted to a degree sufficient to permit the transfer to be satisfactorily carried out, the shaped base material 2 is moved downwardly onto the transfer film F. Then, the shaped base material 2 is further lowered into the transfer liquid L, generating a liquid pressure of the transfer liquid L, so that the transfer pattern 3 on the transfer film F and more particularly on the carrier sheet 8 may be transferred to the surface of the shaped base material 2.

Thereafter, the shaped base material 2 thus provided thereon with a decoration due to transfer of the transfer pattern 3 thereto is drawn up from the transfer liquid L and washed, and then the carrier sheet 8 attached is fully removed from the shaped base material. Finally, the shaped base material 2 is dried, resulting in the printing transfer step being completed. In the illustrated embodiment, activation of the transfer ink is carried out before the transfer film F reaches the transfer liquid L. Alternatively, the activation may take place concurrently with dipping of the transfer film F into the transfer liquid or thereafter. Also, other printing techniques such as gravure printing or the like may be employed for this purpose.

When the coating step is substituted for the printing transfer step, a paint is sprayed onto the surface of the shaped base material 2 or applied thereto by means of a brush or the like while keeping the surface masked, followed by removal of the mask therefrom. This permits a paint-free pattern section to be formed on the shaped base material 2. Also, the coating is carried out in stages or a coated film is partially removed from the shaped base material after the coating, resulting in a difference in thickness of the coated film or formation of a thin-film pattern section. Further, use of a clear paint permits formation of a desired coated film while ensuring a satisfactory concealment exposing treatment on the surface of the shaped base material 2.

(ii) Topcoat Formation Step

The shaped base material 2 on which the transfer pattern 3 having the source pattern applied thereto has been thus printed or the shaped base member 2 on which the coating subjected to the concealment exposing treatment has been thus formed basically provides the decorated shaped product 1. Alternatively, the topcoat 4 may be formed on the thus-formed transfer pattern 3 or coating in order to promote the concealment exposing effect.

For this purpose, a topcoat stock liquid of which viscosity was adjusted to a predetermined level is prepared. Then, the stock solution is sprayed onto the shaped base material 2 on which the transfer pattern 3 has been printed in the printing transfer step by means of, for example, a spray nozzle and then dried, resulting in being cured, leading to formation of the topcoat 4.

(iii) Precision-Finish Step

The topcoat 4 thus formed is then subjected to precision surface finishing, so that surface roughness of the topcoat 4 is precision-finished. For this purpose, buffing may be employed, so that the surface of the topcoat 4 may be finished to a surface roughness sufficient to exhibit satisfactory gloss. Thus, the above-described decorating treatments in series are carried out, resulting in the decorated shaped product 1 of the present invention being completed. When the flow pattern 2a formed on the surface of the shaped base material 2 as described above provides a source expression capable of exhibiting satisfactory design characteristics, the above-described printing transfer step or coating step may be eliminated. In this instance, the the topcoat 4 may be formed directly on the surface of the shaped base material 2, to thereby provide the decorated shaped product.

As can be seen from the foregoing, the decorated shaped product 1 of the present invention which has a source expression applied thereto includes the shaped base material 2 formed by injection molding and the transfer pattern 3 formed on the surface of the shaped base material by printing. The shaped base material 2 is formed by foaming the synthetic resin material so as to be provided on the surface thereof with the flow pattern 2a. The transfer pattern includes the source pattern and is provided at at least a part thereof with at least one of the ink-free pattern section 3a which does not have the transfer ink applied thereto, the thin-film pattern section 3b formed by reducing a thickness of the transfer ink applied and the light-color pattern section 3c formed by light-coloring the transfer ink. The shaped base material 2 has woodmeal W added thereto. Such construction of the decorated shaped product permits the flow pattern 2a appearing on the surface of the shaped base material 2 to be externally observed through the ink-free pattern section 3a, thin-film pattern section 3b and light-color pattern section 3c, so that depth as well as the plane source pattern expressed by the transfer pattern 3 may be exhibited, resulting in an expression closely resembling a source material being obtained. Also, moisture contained in the woodmeal or exposure of the woodmeal on the surface of the shaped base material permits the flow pattern to be emphasized. Also, addition of the woodmeal permits the decorated shaped product to be provided with a wood-like tone.

The synthetic resin material P may be a combination of at least two colored synthetic resin materials different in shade of color from each other or a combination of at least one non-colored synthetic resin material and at least one colored synthetic resin material. This results in the flow pattern 2a which appears on the surface of the shaped base material 2 being provided with a difference in shade of color, so that the flow pattern 2a may be further emphasized.

The woodmeal W may be at least partially colored no that there occurs a difference in shade of color between the woodmeal and the synthetic resin material P. This likewise permits the flow pattern 2a which appears an the surface of the shaped base material 2 to be provided with a difference in shade of color, so chat the flow pattern 2a may be further emphasized.

In the present invention, the woodmeal may have a luster pigment added thereto by placing or embedding the pigment in the woodmeal. Thus, the decorated shaped product 1 exhibits an expression more closely resembling a source material.

The transfer pattern 3 printed may be formed on the surface thereof with the transparent or colored-transparent gloss topcoat 4, which has a precision-finished surface. This permits the flow pattern 2a to be distinctly recognized.

Also, the method for manufacturing a decorated shaped product according to the present invention includes the shaping processing and decoration processing. The shaping processing includes the steps of forming the molding material by adding woodmeal to a synthetic resin material, subjecting the molding material to heating, melting and liquefaction, injecting the molding material into the molding tool 6 while lightly mixing the molding material so as to render it mottled and foaming it, and curing the molding material to form the shaped base material 2. The decoration processing includes the printing transfer step of immersing the thus-formed shaped base material in the transfer liquid wherein the transfer film provided thereon with the source pattern of which at least a part is subjected to the concealment exposing treatment is floated, to thereby form the transfer pattern 3 on the surface of the shaped base material 2 by a liquid pressure due to the immersion. This permits color appearing on the shaped base material 2 after molding to be varied or distributed in a mottled manner, so that it cooperates with the flow pattern 2a on the shaped base material 2 to provide an expression further closely resembling a source material.

In the method of the present invention, the shaping processing may be practiced using an injection molding machine. This results in the shaping processing being smoothly and efficiently accomplished.

In the method of the present invention, the decoration processing may further include the topcoat formation step of forming the transparent or colored-transparent gloss topcoat on the surface of the shaped product after the printing and the precision-finish step of subjecting the topcoat to precision-finish by buffing. This results in the source expression being further promoted.

The decorated shaped product of the present invention which has the source expression applied thereto may include the shaped base material 2 formed by injection molding and the coating applied to the surface of the shaped base material. The shaped base material 2 is formed by foaming the synthetic resin material so as to be provided on the surface thereof with the flow pattern 2a and the coating is subjected at at least a part thereof to the concealment exposing treatment. The shaped base material has the woodmeal W added thereto. Such construction of the present invention permits the flow pattern 2a on the shaped base material 2 to be externally observed through the portion thereof which was subjected to the concealment exposing treatment, so that a combination of color of the coating and the flow pattern 2a may provide an expression for decoration and the flow pattern 2a may be more distinctly observed.

Also, the decorated shaped product of the present invention which has the source expression applied thereto may include the shaped base material 2 formed by injection molding and the topcoat 4 applied to the surface of the shaped base material. The shaped base material is formed by foaming the synthetic resin material so as to be provided on the surface thereof with the flow pattern 2a and the topcoat 4 is formed so as to exhibit transparent or colored transparent gloss. The shaped base material has the woodmeal W added thereto. Such construction permits the flow pattern 2a formed due to foaming of the synthetic resin material to be distinctly expressed, resulting in a more satisfactory decoration being obtained.

The shaped base material may include the body formed of the synthetic resin material having the woodmeal W added thereto by injection molding. The synthetic resin material is subjected to foaming so that the flow pattern 2a may be formed on the surface of the body. This likewise permits the flow pattern 2a formed due to foaming of the synthetic resin material to be distinctly expressed.

The woodmeal W may have the luster pigment G added thereto by placing or embedding it in the woodmeal, so that gloss of the luster pigment G may appear on the shaped base material 2.

Further, in the present invention, the synthetic resin material for the body may be a combination of at least two colored synthetic resin materials different in shade of color from each other or a combination of at least one non-colored synthetic resin material and at least one colored synthetic resin material and is subjected to foaming while being distributed in a mottled manner. This permits the flow pattern 2a to be further promoted.

Moreover, body may have glass fiber added thereto, so that the shaped base material 2 may be increased in mechanical strength, to thereby be decreased in weight, and thickness.

While preferred embodiments of the present invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method of manufacturing a decorated shaped product, the method comprising:
    a shaping process for forming a shaped base product, said shaping process including:
        a) forming a molding material by adding woodmeal to a synthetic resin material;
        b) heating, melting and liquefying the formed molding material;
        c) injecting the molding material into a molding tool and lightly mixing the molding material in order to provide a flow pattern on a surface of the shaped base product and to render it mottled;
        d) foaming the molding material; and
        e) curing the molding material to form the shaped base product; and
    a decoration process including:
        a) providing a transfer film in a supply of transfer liquid, the transfer film having a source pattern;
        b) immersing the formed shaped base product in the transfer liquid to apply the transfer film on a surface of the shaped base product to form a transfer pattern on the surface of the shaped base product by liquid pressure created by the immersion of the shaped base product in the transfer liquid, wherein the source pattern formed on the surface of the shaped base product has at least a portion which permits the flow pattern on the surface of the shaped base product to be visibly observed from outside of a layer of the transfer pattern.

2. A method as claimed in claim 1, wherein the shaped base product is formed by an injection molding process.

3. A method as claimed in claim 2, wherein the shaping process further comprises:

charging the molding material into an injection molding machine which includes a cylinder and a screw arranged in the cylinder;
wherein said heating, melting and liquefying steps are carried out in the cylinder of the injection molding machine, and the steps of lightly mixing the molding material and foaming the molding material being carried out by operation of the screw.

4. A method as claimed in claim 3, further comprising providing the part of the source pattern with at least one of an ink-free pattern section which does not have a transfer ink applied thereto, a thin-film pattern section formed by reducing a thickness of an applied transfer ink, and a light-color pattern section formed by light-coloring a transfer ink.

5. A method as claimed in claim 2, further comprising providing the part of the source pattern with at least one of an ink-free pattern section which does not have a transfer ink applied thereto, a thin-film pattern section formed by reducing a thickness of an applied transfer ink, and a light-color pattern section formed by light-coloring a transfer ink.

6. A method as claimed in claim 1, wherein the synthetic resin material comprises a combination of at least two colored synthetic resin materials which are different in shade of color from each other.

7. A method as claimed in claim 1, wherein the synthetic resin material comprises a combination of at least one non-colored synthetic resin material and at least one colored synthetic resin material.

8. A method as claimed in claim 7, wherein the decoration process further comprises:
    forming a transparent or colored-transparent gloss topcoat on a surface of the shaped product after applying the source pattern; and
    precision-finishing the topcoat by buffing.

9. A method as claimed in claim 1, wherein the decoration process further comprises:
    forming a transparent or colored-transparent gloss topcoat on a surface of the shaped product after applying the source pattern; and
    precision-finishing the topcoat by buffing.

10. A method as claimed in claim 1, wherein the concealment exposing treatment is carried out to provide the part of the source pattern with at least one of an ink-free pattern section which does not have a transfer ink applied thereto, a thin-film pattern section formed by reducing a thickness of an applied transfer ink, and a light-color pattern section formed by light-coloring a transfer ink.

11. A method as claimed in claim 10, wherein the shaping process further includes coloring, at least partially, the woodmeal so that the woodmeal has a shade of color different from that of the synthetic resin material.

12. A method as claimed in claim 1, wherein the shaping process further includes coloring, at least partially, the woodmeal so that the woodmeal has a shade of color different from that of the synthetic resin material.

13. A method as claimed in claim 1, wherein the shaping process further includes adding a luster pigment to the woodmeal by placing the pigment in the woodmeal.

14. A method as claimed in claim 1, wherein the shaping processing further includes adding glass fibers to the synthetic resin material.

* * * * *